United States Patent [19]

Ravenel et al.

[11] Patent Number: 5,525,321

[45] Date of Patent: Jun. 11, 1996

[54] CARBONITRIDING OF ALUMINA TO PRODUCE ALUMINUM NITRIDE

[75] Inventors: Pierre Ravenel, Saint-Genis-Laval; Roland Bachelard, Lyon, both of France

[73] Assignee: Elf Atochem S.A., Puteaux, France

[21] Appl. No.: 307,008

[22] Filed: Sep. 16, 1994

[30] Foreign Application Priority Data

Sep. 17, 1993 [FR] France .................................. 93 11113

[51] Int. Cl.⁶ .................................................. C01B 21/072
[52] U.S. Cl. ............................................. 423/412; 423/659
[58] Field of Search ................................ 423/412, 659

[56] References Cited

U.S. PATENT DOCUMENTS 4,985,230  1/1991  Baden et al. ........................ 423/659

5,370,854  12/1994  Henley et al. ...................... 423/409

FOREIGN PATENT DOCUMENTS 519806  12/1992  European Pat. Off. .............. 423/412
130003  5/1992  Japan ................................... 423/412

Primary Examiner—Wayne Langel
Attorney, Agent, or Firm—Burns, Doane, Swecker & Mathis

[57] ABSTRACT

The invention relates to a continuous process for the preparation of aluminium nitride by the carbonitriding of alumina.

According to this process, the reaction, which employs alumina, carbon and nitrogen, is carried out in a moving-bed reactor characterized in that the reaction area has a plurality of conduits.

16 Claims, 2 Drawing Sheets

CARBONITRIDING OF ALUMINA TO PRODUCE ALUMINUM NITRIDE

BACKGROUND OF THE INVENTION

1. Field of the Invention

The invention relates to continuous processes for the preparation of aluminium nitride by the carbonitriding of alumina using a moving-bed reactor.

2. Discussion of the Prior Art

Processes are known for the continuous preparation of aluminium nitride which use a moving-bed reactor.

In WO 92/16457, it has been proposed to carry out the carbonitriding reaction of alumina in a moving-bed reactor operating with a constant filling rate corresponding to 65–95% of the useful volume of the reactor. This process makes it possible to prepare between 0.5 and 0.8 kg of aluminium nitride granules per hour.

In European Patent Application 0,519,806 it has been proposed to use a methodical reactor operating at a constant filling rate, the length/internal diameter ratio of which is generally between 5 and 20. This process makes it possible to prepare 2.42 kg of aluminium nitride granules per hour.

The major drawback of these technologies resides in the fact that the productivity of this type of reactor remains limited.

One of the ways of increasing the productivity consists in increasing the production of aluminium nitride while keeping the volume of the reactor constant. This generally results in a heterogeneous product, due mainly to an incomplete carbonitriding reaction.

Another way of increasing the productivity consists in decreasing the volume of the reactor while keeping the production constant. Such a volume reduction has the advantage of conserving both a high production and a high homogeneity of the product.

SUMMARY OF THE INVENTION

A new process has now been found for the preparation of aluminium nitride by carbonitriding alumina which makes it possible to achieve a high productivity while using a reactor of low volume. The process includes the reaction between the alumina, carbon and nitrogen is carried out in a moving-bed reactor whose reaction area has a plurality of conduits.

DETAILED DESCRIPTION OF PREFERRED EMBODIMENTS

The expression "moving-bed" is used here in its conventional sense, namely, that it denotes a reactor of piston-flow type.

Reaction area is understood here to refer to the area of the reactor having a temperature compatible with the reaction for carbonitriding alumina, this temperature being generally between 1350° and 2000° C.

In the process in accordance with the invention, a moving-bed reactor operates at a constant filling rate, with a homogeneous and constant residence time of the reactants and a percolation of the charge under conditions which ensure a homogeneous composition of the gas phase around each particle at a given level intense heat exchange and mass transfer.

The constant filling rate may be obtained by means of continuous extraction, for example, by a weighing or volumetric meter located at the base of the moving bed, or by means of a piston-type flow of the charge into a shell of constant cross-section.

Percolation of the charge with nitrogen is advantageously performed counter-current to the solids and at high speed between the granules.

In the process according to the invention, a reactor is used in which the reaction area is composed of a plurality of conduits of low volume.

By use of such reactor it is possible to reduce the energy costs resulting from heating, since heat transfer is improved.

Moreover the amplitude of the thermal gradient existing between the heat-conducting material and the center of each conduit may be reduced. Therefore a product of improved homogeneity may be obtained.

Figure 1A:
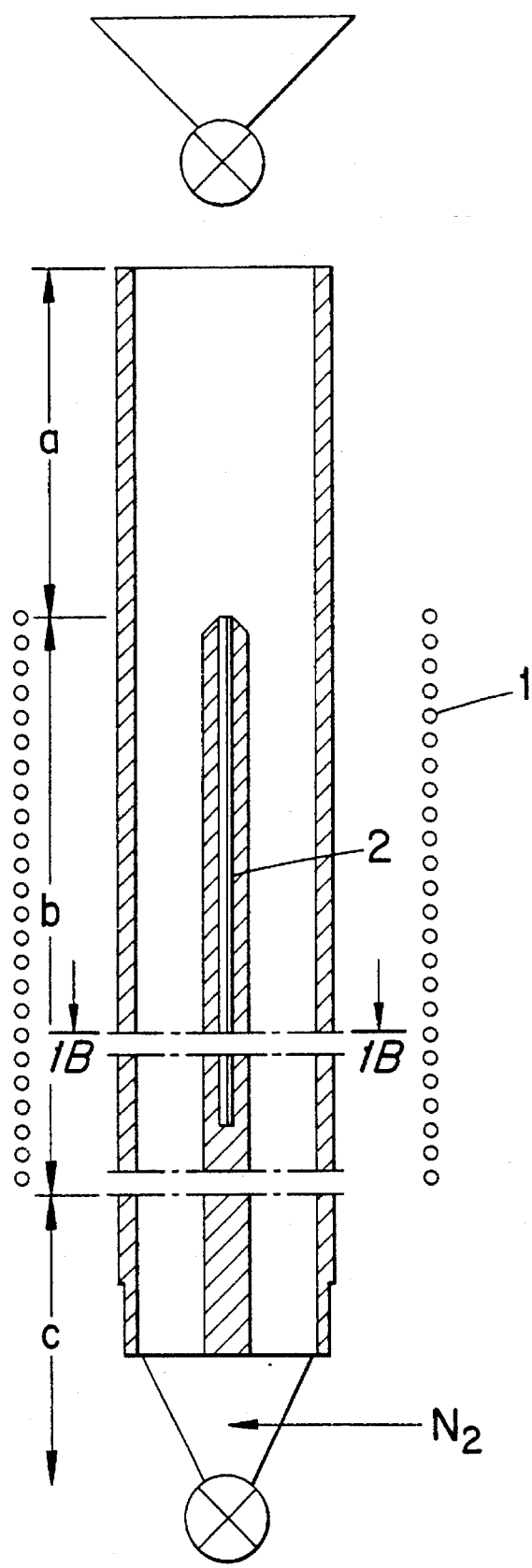
FIG. 1 represents a reactor which may be used in the process of the present invention.
Figure 1B:
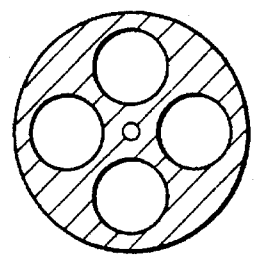

A reactor which may be used in the process of the present invention is represented in the attached FIG. 1.

In FIG. 1, the symbols marked a, b and c correspond to the various areas of the reactor and those marked 1 and 2 refer to the main accessories.

In the process in accordance with the invention, the reactor operates:

as a heater for the starting granules (shaped starting materials) via the exhaust gases, that is to say as a heat exchanger (area a);

as a carbonitriding reactor (area b); and as a heater for the nitrogen entering the reactor, by contact with the granules leaving the reaction area of the kiln (area c).

The schematic reactor represented in FIG. 1, which is intended to operate in a substantially vertical manner, essentially comprises a conduit (area a) and a reaction area comprising a plurality of conduits (area b), generally made of graphite.

Area (a) is connected at its upper part to a metering device which serves to supply the reactor with fresh granules, the filling level being maintained constant by means of a probe (not represented).

The upper part of the area (a) is also connected to an exhaust gas collector (not represented), the said gases essentially consisting of excess $N_2$ and CO which may be conveyed towards the base of an incineration kiln (not represented).

The reaction area (b) is advantageously heated by electromagnetic induction (1).

The temperature at the center of the reaction area is advantageously measured by means of a temperature probe (2).

The reaction area conduits, which may be identical or different, and the number of which is generally between 2 and 12, may have a cross-section of regular or arbitrary shape. By way of examples of a regular shape, circles, ellipses, annuli, right or curvilinear polygons, either regular or non-regular, and the geometrical shapes having an axis of symmetry (FIG. 2) may be mentioned. Conduits having a cross-section of circular shape are preferably used.

Figure 2A:
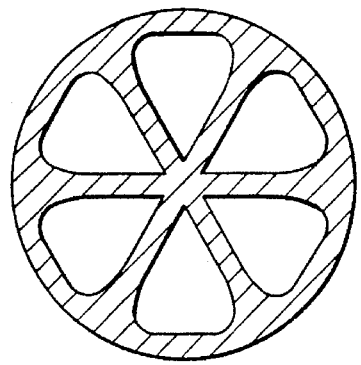
FIG. 2 represents various geometrical shapes of reaction area conduits which may be employed in the reactor.
Figure 2B:
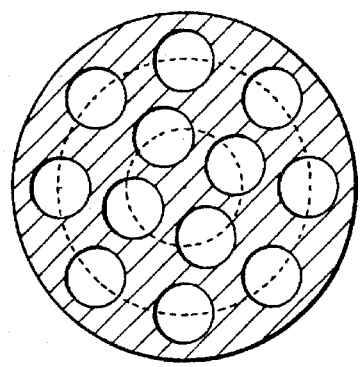
Figure 2C:
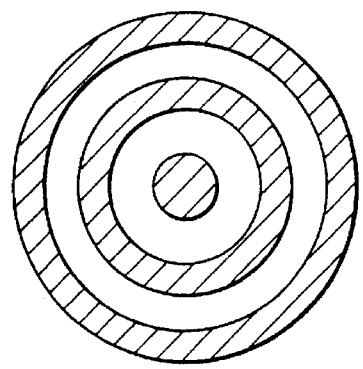

The conduits may be arranged uniformly or non-uniformly inside the reaction area. The conduits are generally arranged uniformly such that, for example, the center of each conduit is located on a circle or several concentric circles whose origin is the center of the reactor or by nesting the conduits within each other (FIG. 2). The conduits are preferably arranged such that the center of each conduit is located on a circle whose origin is the center of the reactor.

The space between the conduits generally consists of a heat-conducting material. By way of example, graphite, tungsten and molybdenum may be mentioned. Preferably, the same material is used which forms the conduits, this generally consisting of graphite.

The lower part of the area (c) is advantageously extended by a shell of frustoconical shape which includes a nitrogen feed. The lower end of this shell possesses a sealed volume-metering device allowing extraction of the granules with a view to their continuous weighing.

In accordance with the invention, the area (a) of the reactor as described above is continuously supplied with granules obtained by shaping a paste consisting of a mixture of alumina and carbon and advantageously, especially in order to facilitate the preparation of this paste, of a binder which may possibly serve as a complementary raw material(s) carrier.

By binder it is understood here to refer to any product which imparts to the granules a mechanical strength compatible with the process according to the invention. Generally, this mechanical strength is determined by measuring the crushing strength and the attrition loss.

When a binder consisting of a thermosetting resin capable of generating carbon during its pyrolysis is used, the amounts of carbon and resin are adjusted so as to impart to the granules at the same time sufficient porosity and sufficient mechanical strength.

Carbon black provides the pore volume favorable to the rate of carbonitriding and the resin binds the granules.

The thermosetting resin may advantageously be chosen from phenol-formaldehyde resins in aqueous solution. Other may also be used, such as epoxy, polyester or polyimide resins.

The black may be chosen from a wide range of carbon blacks, as long as the average particle diameter of the black lies within the range of 0.5 to 10 μm and preferably 1 to 5 μm and as long as their pore volume is at least equal to 0.3 cm$^3$/g. Acetylene black, whose pore volume may reach 10 cm$^3$/g, will be mentioned in particular, purely as a guide.

As regards the alumina, a high-purity alumina should be chosen and a particle size of the same order of magnitude as that of the black is recommended. For the preparation of the paste (and of the granules) and for reasons of homogeneity, it may be advantageous to make use of a dispersant, for example of the type comprising an ammonium salt of a polyacrylic acid.

In the preparation of the granules, a total-carbon amount is generally employed, that is to say carbon as it is and carbon generated by the thermosetting resin equal to or greater than the stoichiometry of the carbonitriding reaction (C/Al$_2$O$_3$ ratio=3): this excess may reach 100% and is preferably between 0 and 50%.

These feed granules have a crushing strength generally between 0.2 and 3 MPa (measured according to the "Bulk Crushing Strength"-Shell method) and an attrition loss generally less than 15%. This attrition loss is measured by introducing 25 g of granules into a closed cylindrical metal tube (internal diameter 36 mm, length 305 mm) fixing the tube to a rotating support in such a way that the rotation axis of the support passes through the middle of the length of the tube; after treatment for one hour at a speed of 25 rpm, the solids obtained are screened (425 μm screen); and recovering and weighing the fines.

The attrition loss is expressed by the relationship:

$$A\% = \frac{P2}{P1} \times 100$$

in which:

A % represents the attrition loss

P1 represents the initial weight of the granules

P2 represents the weight of fines obtained

The fresh granules are introduced into the area (a) of the reactor and their level is maintained constant by means of a probe located in the upper part of this area (not represented).

The granules are conveyed into the carbonitriding area (b) and then into the area (c) where they are cooled by the nitrogen feed.

Cold granules are extracted, by means of the volume-metering device located at the base of the moving bed, which granules may contain an excess of carbon (AlN+C), the granules having a residual α-Al$_2$O$_3$ content of less than 0.5% with respect to AlN (measurement carried out by X-ray diffraction).

The excess carbon may be removed by combustion in a gas containing oxygen, preferably at a temperature not exceeding 700° C.

The pure aluminium nitride is finally deagglomerated, for example in an air-jet mill advantageously equipped with a grinding chamber coated with elastomer, so as to prevent any contamination.

The aluminium nitride powder obtained by means of the implementation of the process described above is provided in the form of particles with an average size between 0.5 and 5 μm, consisting of AlN with a residual α-Al$_2$O$_3$ content not exceeding 0.5% (by weight with respect to AlN) and a B.E.T. specific surface area at least equal to 2 m$^2$/g and possibly reaching 5 m$^2$/g.

The invention is illustrated by the following examples.

EXAMPLE 1

1–550 parts by weight of high-purity alumina, finely ground (average grain size: 1 μm-ASTM C678 Standard; pore volume: 0.76 cm$^3$/g) are mixed with 182 parts by weight of acetylene black (average particle size: 2 to 3 μm; pore volume: 7.0 cm$^3$/g), 257 parts by weight of phenol-formaldehyde resin in aqueous solution (approximately 60% concentration) and 11 parts by weight of an ammonium polyacrylate dispersant.

The mixture is processed in an alumina-coated mixer until disappearance of the white particles of alumina.

The resulting paste is used to feed an extruding press whose extrusion orifices have a diameter of 3 mm. At the exit from these orifices, a cutter cuts up the rods to a length of 6 mm.

The granules thus obtained, dried in a ventilated oven at 150° C., (10.8% weight loss), have the following weight composition:

alumina: 61.6% carbon: 20.4% resin: 17.5% dispersant: 0.5%.

The crushing strength of the granules is 2.8 MPa and the attrition loss is equal to 2.2%.

2—The granules are used to feed the continuously operating moving-bed reactor according to FIG. 1.

The reaction area is composed of four rectilinear tubes of internal diameter 110 mm hollowed out of the graphite and inscribed in a circle of diameter 300 mm. This set of tubes has a volume of 26.6 l.

The feed rate of the granules is 4.05 kg/h.

The reactor is fed at its lower part (c) with nitrogen at a flow rate of 24 kg/h.

The temperature of the external wall of the reaction area (b) is 1450°–1700° C., the residence time in this area being approximately 7 hours.

The temperature of the graphite located at the level of the centre axis of the reaction area, measured by means of the probe (2), is of the same order to magnitude as that of the external wall (in a given horizontal plane). The temperature difference between the external wall and the center of a conduit is less than 50° C.

Upon exiting the area (c), the cooled carbonitrided granules are removed at a rate of 2.3 kg/h (which corresponds to 2.0 kg/h of 100% aluminium nitride).

Under these conditions, the productivity of the reactor is equal to 0.075 kg of 100% aluminium nitride per hour and per liter of reaction area.

3—The granules are taken up and spread out on Inconel trays in a layer of approximately 1 cm in thickness and are then loaded into an electrically heated discontinuous kiln, the temperature being maintained uniform at 650° C.+/–5° C. by circulation of air. This temperature is maintained for 8 hours. The weight loss is approximately 15%.

After this treatment, the residual free carbon content is less than 700 ppm, the oxygen content not exceeding 1%.

The aluminium nitride thus obtained is finally deagglomerated in an air-jet mill with walls coated with elastomer.

The average size of the final aluminium nitride particles is 1 μm and the B.E.T. specific surface area of this aluminium nitride is 4 m$^2$/g.

EXAMPLE 2 (COMPARATIVE)

The procedure is carried out under the same conditions as Example 1 and in the presence of the reactor of FIG. 1 which is modified so that the reaction area consists of a single tube having an internal diameter of 300 mm and a volume of 49.5 l.

The feed rate of the granules is 4.2 kg/h.

The reactor is fed at its lower part (c) with nitrogen at a flow rate of 16 kg/h.

The residence time in the reaction area is approximately 12 hours.

For a given horizontal plane, a temperature difference between the external wall of the reaction area and the center of the conduit is measured to be greater than 200° C.

Upon exiting the area (c), the cooled carbonitrided granules are removed at a rate of 2.40 kg/h (which corresponds to 2.04 kg/h of 100% aluminium nitride).

Under these conditions, the productivity of the reactor is equal to 0.0412 kg of 100% aluminium nitride per hour and per liter of reaction area.

The average size of the final aluminium nitride particles is 1.4 μm and the B.E.T. specific surface area of this aluminium nitride is 3.5 m$^2$/g.

We claim:

1. A process for the continuous production of aluminum nitride, which comprises carbonitriding a continuously replenished charge of alumina, in the presence of carbon and nitrogen, in a moving-bed reactor which comprises a reaction area made of a plurality of reaction passages and a heat-conducting material between said passages; and continuously withdrawing product aluminum nitride from said moving-bed reactor.

2. The process according to claim 1, wherein the reaction passages, which may have an identical or different cross-sectional shape, have a cross-sectional shape selected from circles, ellipses, annuli, and right or curvilinear polygons whether regular or irregular.

3. The process according to claim 1, wherein the reaction passages, which may have an identical or different cross-sectional shape, have a cross-sectional shape having an axis of symmetry.

4. The process according to claim 3, wherein the cross-sectional shape of said reaction passages is a circle.

5. The process according to claim 1, wherein the reaction passages are arranged uniformly inside the reaction area.

6. The process according to claim 5, wherein the reaction passages are arranged such that their center is located on one or more concentric circles whose origin is the center of the reactor.

7. The process according to claim 5, wherein the reaction passages are nested within each other.

8. The process according to claim 1, wherein nitrogen is fed to said moving-bed reactor countercurrent to said alumina.

9. The process according to claim 1, wherein the heat-conducting material is graphite, tungsten or molybdenum.

10. The process according to claim 1, wherein the heat-conducting material is graphite.

11. The process according to claim 1, wherein the reaction passages are made of conduits and space between the conduits is filled with said heat-conducting material.

12. The process according to claim 11, wherein the material which is in said space is the same material which forms the conduits.

13. The process according to claim 1, further comprising combining alumina and carbon with a binder to form granules having a crushing strength of between 0.2 and 3 MPa and an attrition loss of less than 15% and then introducing the granules into said moving-bed reactor.

14. The process according to claim 13, wherein said binder is based upon a phenol-formaldehyde epoxy, polyester or polyimide resin.

15. The process according to claim 14, wherein said binder is based upon a phenol-formaldehyde resin.

16. The process according to claim 1, wherein said carbon has an average particle diameter of from 0.5 to 10 μm and a pore volume of at least 0.3 cm$^3$/g.

* * * * *